US008750422B2

(12) United States Patent
Yu

(10) Patent No.: US 8,750,422 B2
(45) Date of Patent: *Jun. 10, 2014

(54) MULTI-TRANSPORT STREAM (TS) GENERATING APPARATUS AND METHOD, AND DIGITAL BROADCASTING TRANSMISSION AND RECEPTION APPARATUSES AND METHODS

(75) Inventor: Jung-pil Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 800 days.

This patent is subject to a terminal disclaimer.

(21) Appl. No.: 12/261,530

(22) Filed: Oct. 30, 2008

(65) Prior Publication Data

US 2009/0060052 A1    Mar. 5, 2009

Related U.S. Application Data

(63) Continuation of application No. 11/938,948, filed on Nov. 13, 2007.

(30) Foreign Application Priority Data

Apr. 13, 2007   (KR) .................................. 2007-36436

(51) Int. Cl.
*H03K 9/00*      (2006.01)
*H04L 5/12*      (2006.01)

(52) U.S. Cl.
USPC ............ 375/316; 375/229; 375/265; 375/262

(58) Field of Classification Search
USPC ......... 375/229–236, 262, 265, 259, 285, 316, 375/324, 340, 341, 295
See application file for complete search history.

(56) References Cited

U.S. PATENT DOCUMENTS

| 5,907,582 | A  |   | 5/1999  | Yi |
| 6,996,162 | B1 | * | 2/2006  | Hosur et al. ................... 375/150 |
| 7,088,793 | B1 | * | 8/2006  | Mickelson et al. ........... 375/341 |
| 7,620,881 | B2 | * | 11/2009 | Nieto ............................ 714/794 |
| 7,711,045 | B2 |   | 5/2010  | Park et al. |

(Continued)

FOREIGN PATENT DOCUMENTS

| KR | 2005-49923      |   | 5/2005 |
| KR | 1020060006268   | A | 1/2006 |
| KR | 1020070008406   | A | 1/2007 |

OTHER PUBLICATIONS

U.S. Appl. No. 11/938,948, filed Nov. 13, 2007, Jung-pil Yu, Samsung Electronics Co., Ltd.

(Continued)

*Primary Examiner* — Sam K Ahn
*Assistant Examiner* — Linda Wong
(74) *Attorney, Agent, or Firm* — Sughrue Mion, PLLC

(57) ABSTRACT

A multi-transport stream (TS) generating apparatus and method, and digital broadcasting transmission and reception apparatuses and method are provided. The multi-TS generating apparatus includes an adaptor to generate an adaptation field in some packets of a normal stream; an interleaver to interleave the normal stream; a turbo processor to turbo-code a plurality of turbo streams; a stuffer to generate a multi-TS by stuffing the plurality of the turbo streams into the adaptation field; and a deinterleaver to deinterleave the multi-TS. Accordingly, the plurality of the turbo streams can be transmitted far more easily.

12 Claims, 11 Drawing Sheets

(56) References Cited

U.S. PATENT DOCUMENTS

| | | |
|---|---|---|
| 7,813,426 B2 | 10/2010 | Park et al. |
| 7,844,012 B2 | 11/2010 | Park et al. |
| 7,848,462 B2 | 12/2010 | Park et al. |
| 7,873,103 B2 | 1/2011 | Park et al. |
| 8,068,565 B2 | 11/2011 | Park et al. |
| 8,238,486 B2 | 8/2012 | Park et al. |
| 8,379,714 B2 | 2/2013 | Park et al. |
| 2004/0006735 A1* | 1/2004 | Mar et al. ............... 714/796 |
| 2004/0057535 A1* | 3/2004 | Strolle et al. ............. 375/340 |
| 2004/0196164 A1* | 10/2004 | Jaffe et al. ................. 341/50 |
| 2005/0060632 A1* | 3/2005 | Honary et al. ............ 714/795 |
| 2005/0111586 A1* | 5/2005 | Kang et al. ............... 375/321 |
| 2007/0014379 A1 | 1/2007 | Park et al. |
| 2007/0217499 A1* | 9/2007 | Limberg ................... 375/240 |
| 2007/0248183 A1 | 10/2007 | Park et al. |
| 2008/0081575 A1* | 4/2008 | Mathew et al. ......... 455/187.1 |
| 2009/0055710 A1 | 2/2009 | Park et al. |
| 2009/0122914 A1 | 5/2009 | Park et al. |
| 2009/0122915 A1 | 5/2009 | Park et al. |
| 2009/0122916 A1 | 5/2009 | Park et al. |
| 2009/0122917 A1 | 5/2009 | Park et al. |
| 2009/0122924 A1 | 5/2009 | Park et al. |
| 2009/0129506 A1 | 5/2009 | Park et al. |
| 2009/0129507 A1 | 5/2009 | Park et al. |
| 2009/0129512 A1 | 5/2009 | Park et al. |
| 2009/0220026 A1 | 9/2009 | Park et al. |
| 2009/0225886 A1 | 9/2009 | Park et al. |

OTHER PUBLICATIONS

U.S. Appl. No. 12/261,460, filed Oct. 30, 2008, Jung-pil Yu, Samsung Electronics Co., Ltd.
U.S. Appl. No. 12/261,553, filed Oct. 30, 2008, Jung-pil Yu, Samsung Electronics Co., Ltd.
U.S. Appl. No. 12/261,575, filed Oct. 30, 2008, Jung-pil Yu, Samsung Electronics Co., Ltd.
U.S. Appl. No. 12/261,593, filed Oct. 30, 2008, Jung-pil Yu, Samsung Electronics Co., Ltd.
U.S. Appl. No. 12/261,618, filed Oct. 30, 2008, Jung-pil Yu, Samsung Electronics Co., Ltd.
Communication dated Jun. 12, 2013 issued by the Korean Patent Office in counterpart Korean Application No. 1020070036436.
Communication dated Jun. 21, 2013 issued by the Korean Patent Office in counterpart Korean Application No. 1020090118756.

* cited by examiner

MULTI-TRANSPORT STREAM (TS) GENERATING APPARATUS AND METHOD, AND DIGITAL BROADCASTING TRANSMISSION AND RECEPTION APPARATUSES AND METHODS

CROSS-REFERENCE TO RELATED APPLICATIONS

This application is a continuation of U.S. Application Ser. No. 11/938,948, filed on Nov. 13, 2007, now pending, which claims all benefits accruing under 35 U.S.C. §119 from Korean Application No. 2007-36436, filed on Apr. 13, 2007 in the Korean Intellectual Property Office, the disclosures of which are incorporated herein by reference.

BACKGROUND OF THE INVENTION

1. Field of the Invention

Aspects of the present invention relate to a multiple-transport stream (TS) generating apparatus and method, and a digital broadcasting transmission and reception apparatuses and methods. More particularly, aspects of the present invention relate to a multi-TS generating apparatus and method of transmitting and receiving a plurality of turbo streams, and digital broadcasting transmission and reception apparatuses and methods.

2. Description of the Related Art

With advances in electronic and communication technologies, digital technology has been introduced into broadcast system applications, and various standards have been presented for digital broadcasting. Specifically, the various standards include the Advanced Television Systems Committee (ATSC) Vestigial Sideband Modulation (VSB) standard used in the United States, and the Digital Video Broadcasting—Terrestrial (DVB-T) standard used in Europe.

The ATSC VSB standard for transmission used in the United States, based on National Television Standards Committee (NTSC) frequency band, features a simplified and an economically efficient implementation of a transmitter and a receiver. Using a single carrier amplitude modulation VSB, the ATSC VSB standard enables transmission of video data, audio data, and auxiliary data of high quality over a single 6 MHz bandwidth.

FIG. 1 is a block diagram of a typical digital broadcasting transmission system. As shown in FIG. 1, the digital broadcasting transmission system includes an emission multiplexer (MUX) 10, an exciter 20, and a power amplifier 30. The emission MUX 10 receives a normal stream, and a turbo stream and outputs a dual transport stream (TS) by multiplexing the normal stream and the turbo stream. Herein, the normal stream is a standard stream for compatibility with an existing digital broadcasting transmission system, and the turbo stream is a stream added according to the ATSC VSB standard.

The exciter 20 receives and processes the dual TS from the emission MUX 10. In more detail, the exciter 20 performs processes such as randomization, RS (Reed-Solomon) encoding, interleaving, and turbo processing, with respect to the dual TS, appends a segment sync signal and a field sync signal, inserts a pilot, and then modulates the dual TS. The dual TS output from the exciter 20 is amplified by the power amplifier 30 to a power suitable for transmission and then is transmitted to a receiver (not shown) over an antenna 40. The receiver separates the turbo stream from the dual TS, demodulates the turbo stream using a turbo repetitive demodulator (not shown), and generates a transport stream including only the turbo stream.

As such, the dual TS transmitted from the transmitter to the receiver includes the normal stream and the turbo stream. That is, in addition to the normal stream, one stream is further included in the dual TS. However, it is impossible for a typical digital broadcasting transmission system that generates the dual TS to include two or more additional streams.

SUMMARY OF THE INVENTION

Aspects of the present invention relate to a multi-TS generating apparatus and method of transmitting various broadcast signals by adding a plurality of turbo streams to a normal stream using one or more turbo processors, and digital broadcasting transmission and reception apparatuses and methods.

Additional aspects and/or advantages of the invention will be set forth in part in the description which follows and, in part, will be obvious from the description, or may be learned by practice of the invention.

According to an example embodiment of the present invention, a multi-TS generating apparatus includes an adaptor to generate an adaptation field in some packets of a normal stream; an interleaver to interleave the normal stream; a turbo processor to turbo-code a plurality of turbo streams; a stuffer to generate a multi-transport stream (TS) by stuffing the plurality of the turbo streams into the adaptation field; and a deinterleaver to deinterleave the multi-TS.

According to an example embodiment of the present invention, the multi-TS generating apparatus may further include a randomizer to randomize the normal stream including the adaptation field; a parity area generator to generate a parity area for the normal stream; a parity area eliminator to remove the parity area from the multi-TS; and a derandomizer to derandomize the multi-TS from which the parity area is removed.

According to an example embodiment of the present invention, the turbo processor may include one or more turbo preprocessors to information-process respective ones of the plurality of the turbo streams; one or more outer encoders to encode the respective ones of the plurality of the turbo streams; and one or more outer interleavers to interleave the respective ones of the plurality of the encoded turbo streams.

According to an example embodiment of the present invention, each of the turbo preprocessors may include an eraser encoder to eraser-encode one of the plurality of the turbo streams; an RS encoder to RS-encode the one turbo stream; and a place holder maker to generate a parity addition area for the one turbo stream.

According to an example embodiment of the present invention, the turbo preprocessor, the outer encoder, and the outer interleaver may be provided to correspond to a number of the turbo streams respectively.

According to an example embodiment of the present invention, the turbo preprocessor and the outer encoder may be provided to correspond to the number of the turbo streams respectively, and at least one outer interleaver may be provided.

According to an example embodiment of the present invention, at least one turbo preprocessor, at least one outer encoder, and at least one outer interleaver may be provided to time-divide and process the plurality of the turbo streams.

According to another example embodiment of the present invention, a multi-TS generating apparatus includes an adaptor to receive a normal stream and generate an adaptation field in some packets of the normal stream; a turbo processor to turbo-code a plurality of turbo streams; a multi-stream interleaver to interleave the plurality of the turbo streams; and a stuffer to generate a multi-TS by stuffing the turbo streams in the adaptation field.

According to another example embodiment of the present invention, a digital broadcasting transmission apparatus to transmit a multi- transport stream (TS) in which a plurality of turbo streams is added to a normal stream, includes a transmission (TX) randomizer to randomize the multi-TS; a Reed-Solomon (RS) encoder to RS-encode the multi-TS; a TX interleaver to interleave the multi-TS; a multiplexer to multiplex by adding sync signals to the multi-TS; and a modulator to modulate the multi-TS.

According to another example embodiment of the present invention, a digital broadcasting reception apparatus to receive a multi-transport stream (TS) in which a plurality of turbo streams is added to a normal stream includes a demodulator to receive and demodulate the multi-TS; an equalizer to equalize the multi-TS; a viterbi decoder to viterbi-decode the normal stream of the multi-TS; a trellis decoder to trellis-decode the plurality of the turbo streams of the multi-TS; and a turbo decoder to turbo-decode the plurality of the turbo streams.

According to another example embodiment of the present invention, a multi-TS generating method includes generating an adaptation field in some packets of a normal stream; interleaving the normal stream; turbo-coding a plurality of turbo streams; generating a multi-TS by stuffing the plurality of the turbo streams in the generated adaptation field; and deinterleaving the generated multi-TS.

According to another example embodiment of the present invention, a multi-TS generating method includes generating an adaptation field in some packets of a normal stream; turbo-coding a plurality of turbo streams; interleaving the plurality of the turbo streams; and generating a multi-TS by stuffing the turbo streams into the generated adaptation field.

According to another example embodiment of the present invention, a digital broadcasting transmission method of transmitting a multi-TS in which a plurality of turbo streams is added to a normal stream, includes randomizing a multi-TS; RS-encoding the randomized multi-TS; interleaving the multi-TS; multiplexing by adding sync signals to the multi-TS; and modulating the multi-TS.

According to another example embodiment of the present invention, a digital broadcasting reception method of receiving a multi-TS in which a plurality of turbo streams is added to a normal stream, includes receiving and demodulating the multi-TS; equalizing the multi-TS; viterbi-decoding the normal stream of the multi-TS; trellis-decoding the plurality of the turbo streams of the multi-TS; and turbo-decoding the plurality of the turbo streams.

According to another example embodiment of the present invention, a multi-transport stream (TS) generating apparatus includes an adaptor to generate an adaptation field in some packets of a normal stream; a turbo processor to turbo-code a plurality of turbo streams; and a stuffer to generate a multi-TS by stuffing the plurality of the turbo streams in the adaptation field.

According to another example embodiment of the present invention, a digital broadcasting method includes generating an adaptation field in some packets of a normal stream; turbo-coding a plurality of turbo streams; generating a multi-TS by stuffing the plurality of the turbo streams in the adaptation field; and transmitting the multi-TS containing the plurality of the turbo streams via a transmission channel for subsequent signal reception and processing.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
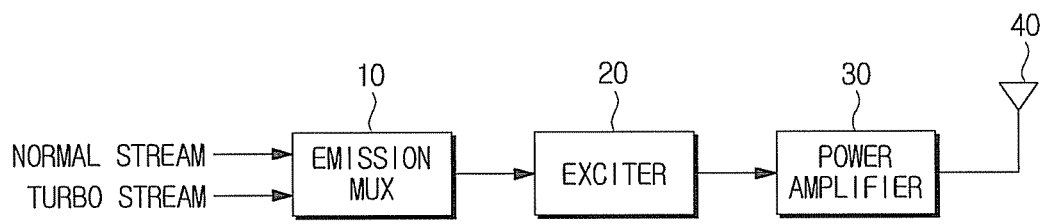
FIG. 1 is a block diagram of a typical digital broadcast transmission system.

Reference will now be made in detail to the example embodiments of the present invention, which are illustrated in the accompanying drawings, wherein like reference numerals refer to the like elements throughout. The example embodiments are described below in order to explain the present invention by referring to the figures.

Figure 2:
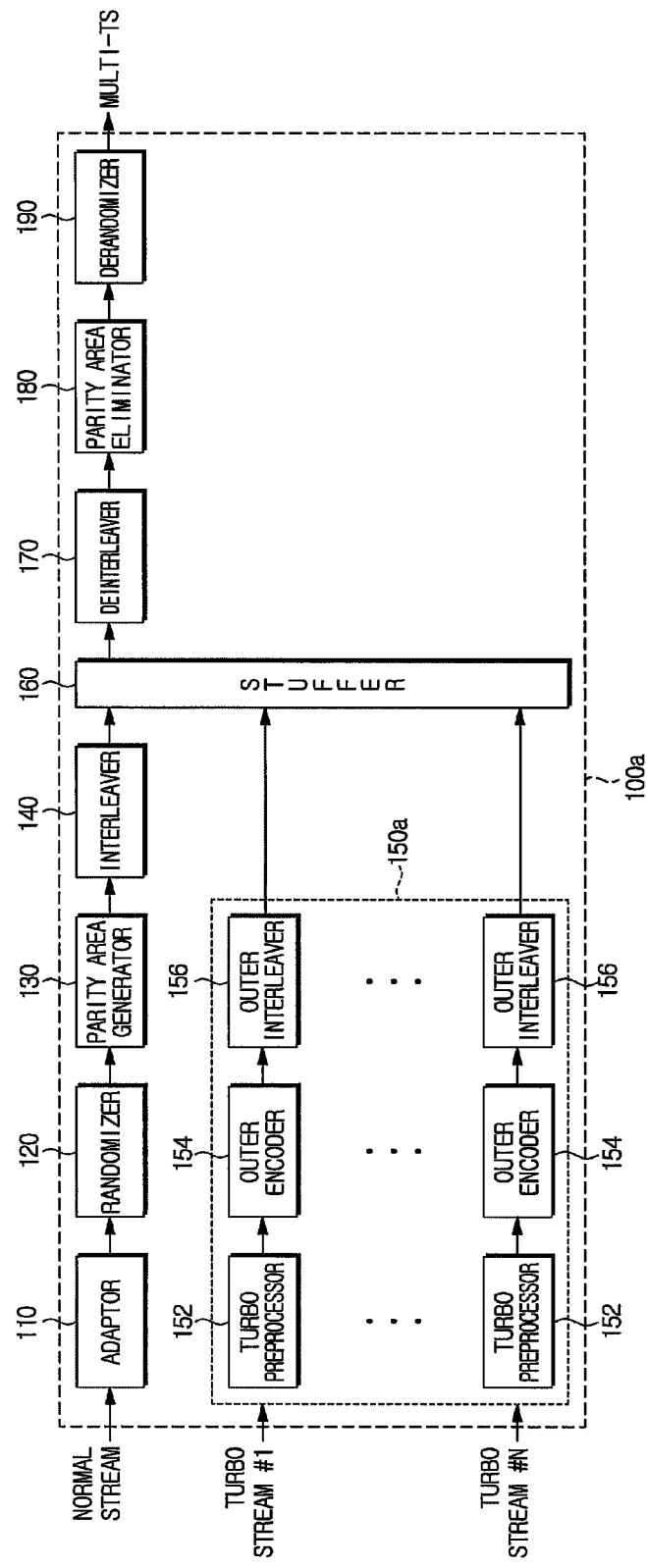
FIG. 2 is a block diagram of a multi-transport stream (TS) generating apparatus according to an example embodiment of the present invention.

FIG. 2 is a block diagram of a multi-transport stream (TS) generating apparatus 100a according to an example embodiment of the present invention. As shown in FIG. 2, the multi-TS generating apparatus 100a includes an adaptor 110, a randomizer 120, a parity area generator 130, an interleaver 140, a turbo processor 150a, a stuffer 160, a deinterleaver 170, a parity area eliminator 180, and a derandomizer 190.

The adaptor 110 receives a normal stream and generates an adaptation field to some packets of the received normal stream to enable stuffing of the turbo streams (or packets thereof). Herein, the normal stream is a standard stream for compatibility with an existing digital broadcasting transmission and reception system, and the turbo stream is a stream that is robust-processed to enhance the reception performance thereof.

The adaptation field generated by the adaptor 110 can be defined variously according to the structure of the multi-TS. For instance, the adaptation field can be generated in part or all of a payload area of a normal stream packet. Herein, the multi-TS refers to a stream where the normal stream and the turbo streams are mixed. In other example embodiments, the normal stream and the turbo stream are mixed by including the turbo stream packet in the normal stream packet and/or by multiplexing the normal stream and the turbo stream. The randomizer 120 randomizes the normal stream that includes the adaptation field generated by the adaptor 110. The parity area generator 130 generates a parity area for the normal stream that is randomized in the randomizer 120. Herein, the parity area refers to an area for inserting, that is, for recording a parity bit calculated for the multi-TS. The interleaver 140 interleaves the normal stream that includes the parity area generated by the parity area generator 130 byte by byte.

The turbo processor 150a turbo-decodes a plurality of turbo streams, for example, turbo streams #1 through #N. To do so, the turbo processor 150a includes at least one turbo preprocessor 152, at least one outer encoder 154, and at least one outer interleaver 156. The turbo preprocessor 152 processes information of the input turbo stream. The outer encoder 154 encodes the turbo stream that is output from the turbo preprocessor 152. The outer interleaver 156 interleaves the turbo stream that is output from the outer encoder 154.

In FIG. 2, the turbo processor 150a includes the plurality of the turbo preprocessors 152, the outer encoders 154, and the outer interleavers 156 corresponding to the plurality of the turbo streams. For example, when two turbo streams are to be transmitted together with the normal stream, two turbo preprocessors 152, two outer encoders 154, and two outer interleavers 156 are respectively provided.

In other example embodiments, the turbo processor 150a may include one or more turbo preprocessor 152, one or more outer encoder 154, and one or more outer interleaver 156, whose respective numbers are less than or different from the number of the turbo streams. In this case, the included turbo preprocessor 152, the outer encoder 154, and the outer interleaver 156 can time-divide and process a plurality of the turbo streams. That is, the turbo preprocessor 152, the outer encoder 154, and the outer interleaver 156 can divide the processing time of each turbo stream by a preset time unit and process the turbo streams. When at least one turbo preprocessor 152, at least one outer encoder 154, and at least one outer interleaver 156 process the plurality of the turbo streams, the hardware complexity can be attenuated.

As shown in FIG. 2, the stuffer 160 generates a multi-TS by stuffing the turbo streams (or packets thereof) output from the turbo processor 150a into the adaptation field of the normal stream output from the interleaver 140. The deinterleaver 170 deinterleaves the multi-TS output from the stuffer 160. The parity area eliminator 180 removes the parity area from the multi-TS output from the deinterleaver 170. The derandomizer 190 derandomizes the multi-TS output from the parity area eliminator 180. The multi-TS output from the derandomizer 190 is transmitted to a digital broadcasting transmission apparatus of FIG. 7, to be explained later.

Figure 3:
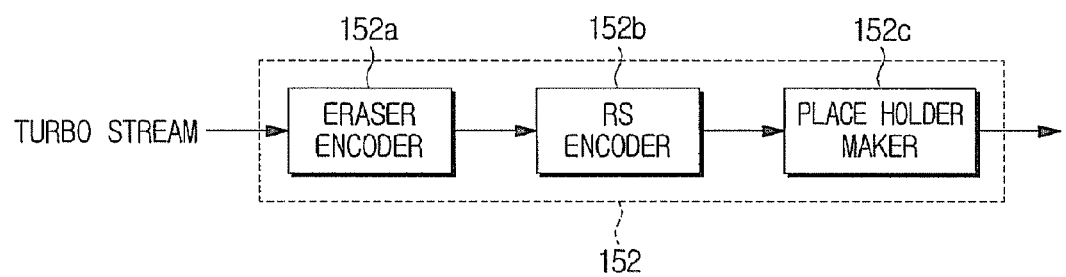
FIG. 3 is a block diagram of a turbo preprocessor according to an example embodiment of the present invention.

FIG. 3 is a block diagram of the turbo preprocessor 152 according to an example embodiment of the present invention. The turbo processor 152 may be that shown in FIG. 2. As shown in FIG. 3, the turbo preprocessor 152 of includes an eraser encoder 152a, an RS (Reed-Solomon) encoder 152b, and a place holder maker 152c.

The eraser encoder 152a eraser-encodes the turbo stream. The eraser encoding of the turbo stream aims to enhance the reception performance by removing noise of the turbo stream. The RS encoder 152b RS-encodes the turbo stream output from the eraser encoder 152a. The place holder maker 152c generates and appends a parity addition area to the turbo stream output from the RS encoder 152b.

Figure 4:
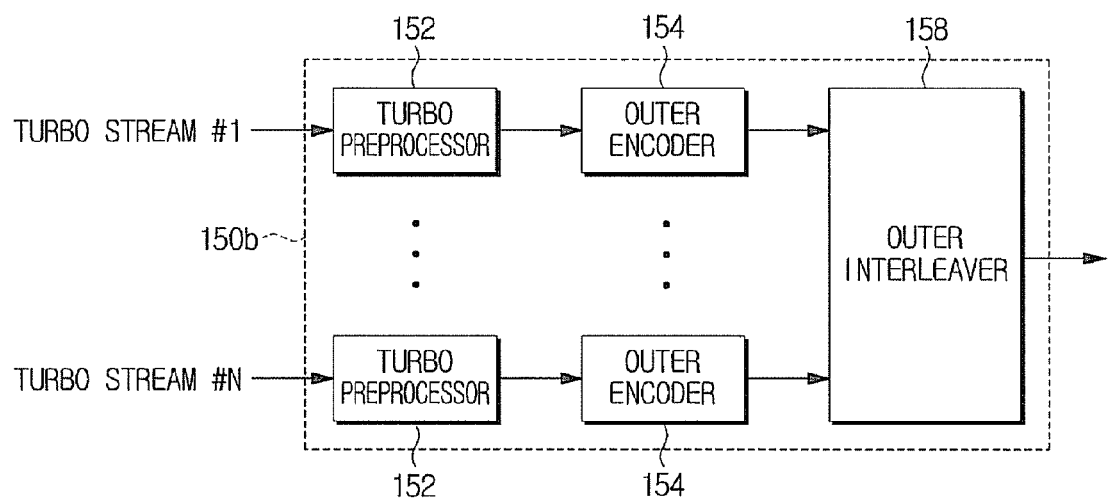
FIG. 4 is a block diagram of a turbo processor according to another example embodiment of the present invention.

FIG. 4 is a block diagram of a turbo processor 150b according to another example embodiment of the present invention. The turbo processor 150b may be used in the multi-transport stream (TS) generating apparatus 100a of FIG. 2. Referring to FIGS. 2 and 3, the turbo processor 150b includes at least one turbo preprocessor 152, at least one outer encoder 154, and at least one outer interleaver 156 in equal numbers, but not limited to the number. That is, any equal numbers of the turbo preprocessor 152, the outer encoder 154, and the one outer interleaver 156 may be provided, though not required.

One difference between the turbo processor 150b of FIG. 4 and the turbo processor 150a of FIG. 2 is that, although both the turbo preprocessors 152 and the outer encoders 154 of the turbo processors 150a, 150b are equipped to correspond to the plurality of the turbo streams, only one outer interleaver 158 is provided in the turbo processor 150b of FIG. 4. The outer interleaver 158 receives the plurality of the turbo streams from the turbo preprocessors 152 and the outer encoders 154, and interleaves the received turbo streams. The outer interleaver 158 of FIG. 4 has the different reference numeral from that of the outer interleaver 156 of FIG. 2 to distinguish them. The turbo processor 150b as shown in FIG. 4 can acquire a higher diversity gain than the turbo processor 150a of FIG. 2.

Figure 5:
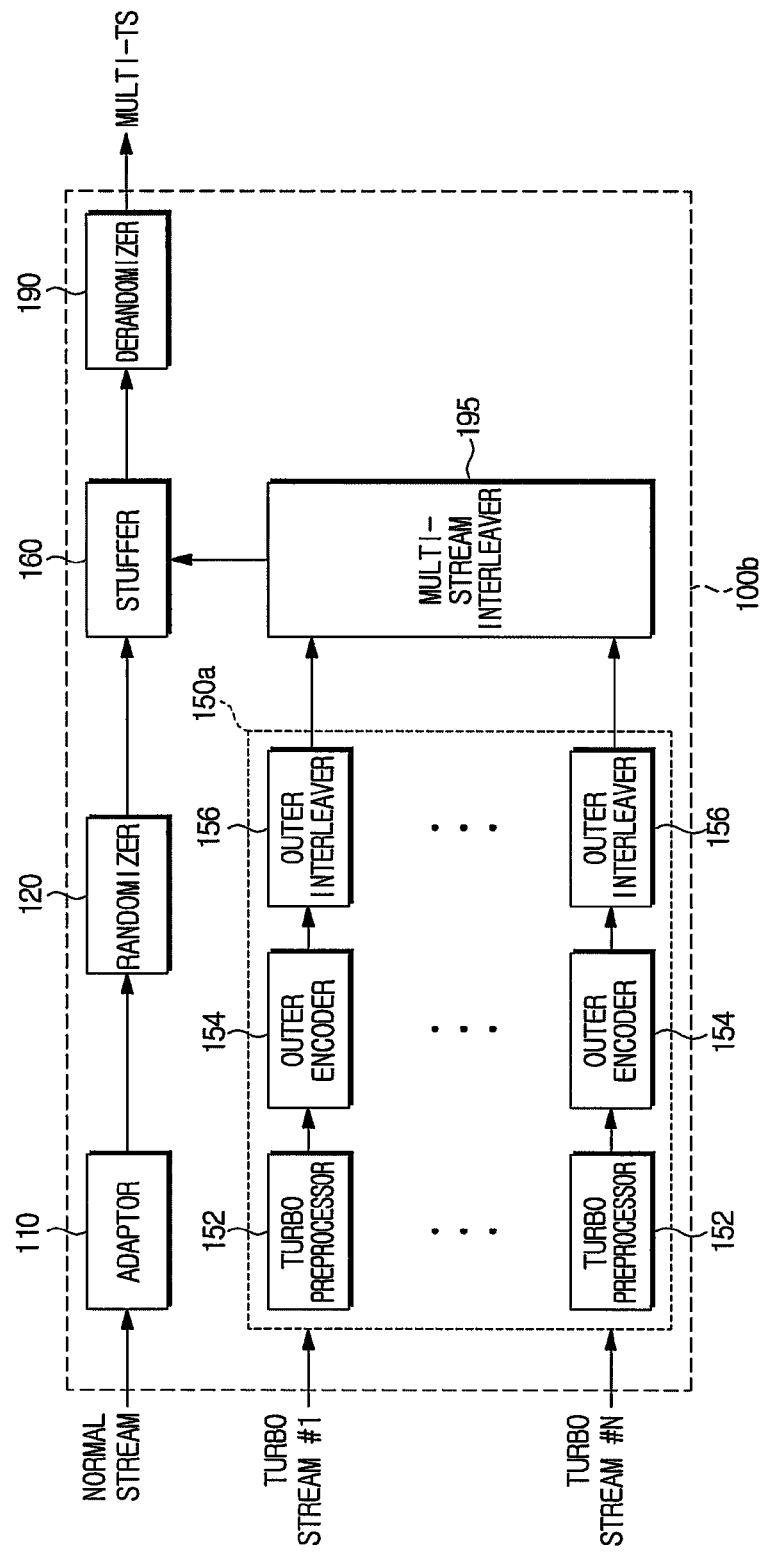
FIG. 5 is a block diagram of a multi-TS generating apparatus according to another example embodiment of the present invention.

FIG. 5 is a block diagram of a multi-TS generating apparatus 100b according to another example embodiment of the present invention. Since the multi-TS generating apparatus 100b has components that are similar to or the same as those of the multi-TS generating apparatus 100a of FIG. 2, the same components have the same reference numbers. The common components are not explained but different components are described.

The multi-TS generating apparatus 100b of FIG. 5 includes an adaptor 110, a randomizer 120, a turbo processor 150a, a stuffer 160, a derandomizer 190, and a multi-stream interleaver 195. It should be noted that the randomizer 120 and the derandomizer 190 can be omitted in other example embodiments.

As shown in FIG. 5, an adaptation field is generated in the normal stream by the adaptor 110. The normal stream is randomized by the randomizer 120 and fed to the stuffer 160. Additionally, a plurality of turbo streams is processed by the turbo processor 150a and fed to the multi-stream interleaver 195. The multi-stream interleaver 195 interleaves the turbo streams processed in the turbo processor 150a and provides the interleaved turbo streams to the stuffer 160. The stuffer 160 generates a multi-TS by stuffing the turbo streams (or packets thereof) into the adaptation field of the normal stream. The multi-TS is derandomized by the derandomizer 190 and then transmitted to a digital broadcasting transmission apparatus of FIG. 7, to be explained later. In other example embodiments, the turbo processor 150b may be used with the multi-TS generating apparatus 100b.

While the multi-TS generating apparatus 100b of FIG. 5 has a different structure from the multi-TS generating apparatus 100a of FIG. 2, they achieve the same effect.

Figure 6:
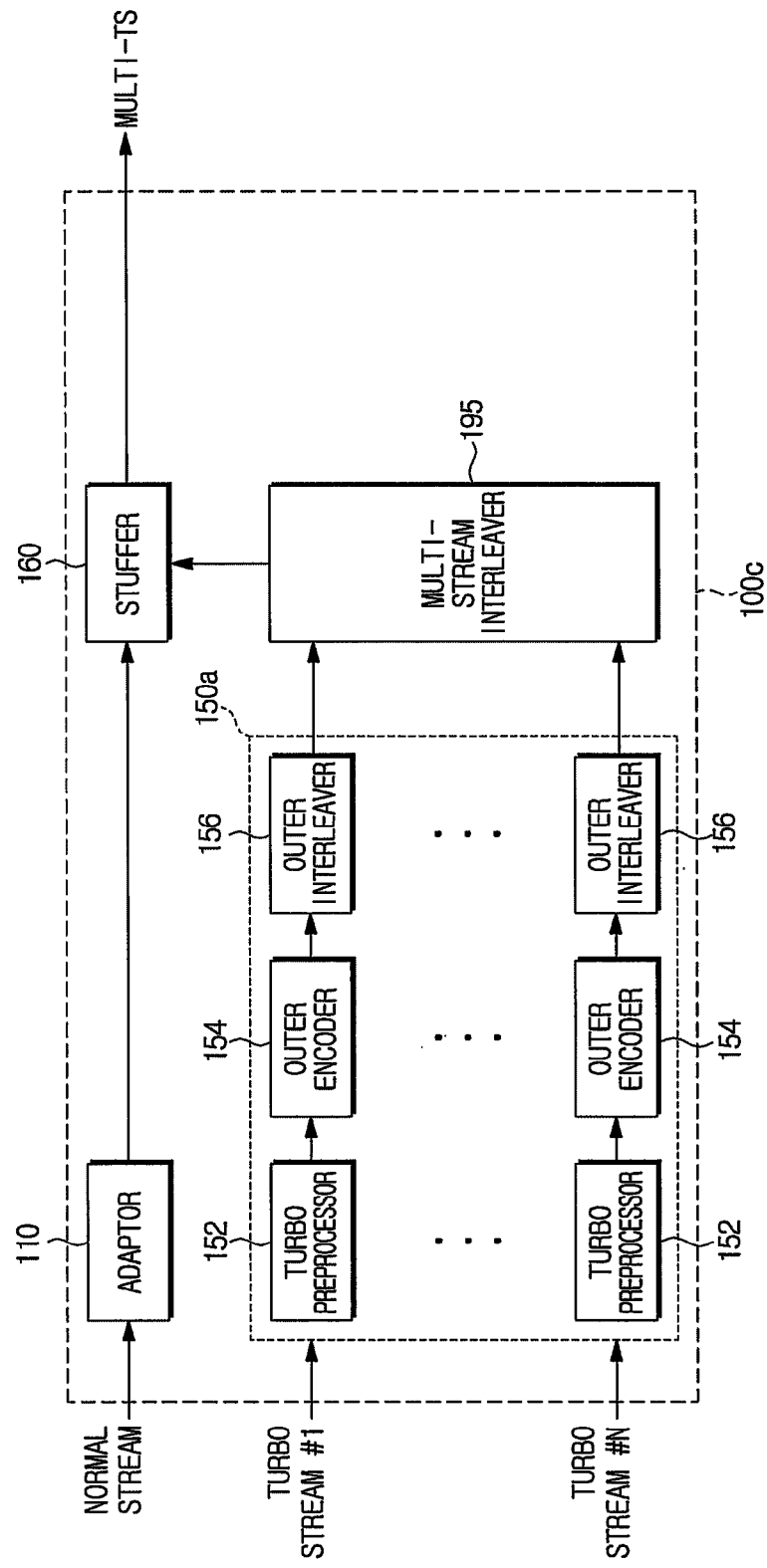
FIG. 6 is a block diagram of a multi-TS generating apparatus according to yet another example embodiment of the present invention.

FIG. 6 is a block diagram of a multi-TS generating apparatus 100c according to another example embodiment of the present invention. The multi-TS generating apparatus 100c of FIG. 6 includes an adaptor 110, a turbo processor 150a, a stuffer 160, and a multi-stream interleaver 195.

The multi-TS generating apparatus 100c of FIG. 6 has components that are similar to or the same as those of the multi-TS generating apparatus 100b of FIG. 5. Compared to the example embodiment of FIG. 5, the multi-TS generating apparatus 100c of FIG. 6 does not include a randomizer 120 and a derandomizer 195, but achieves the same effect with a different structure.

Figure 7:
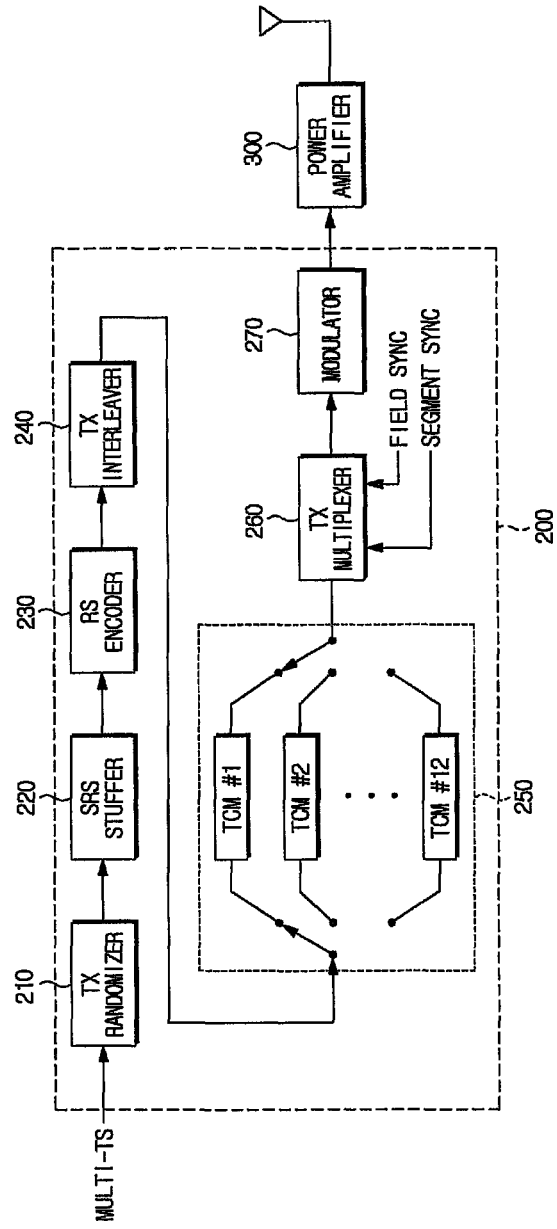
FIG. 7 is a block diagram of a digital broadcasting transmission apparatus according to an example embodiment of the present invention.

FIG. 7 is a block diagram of a digital broadcasting transmission apparatus 200 according to an example embodiment of the present invention. The digital broadcasting transmission apparatus 200 includes a transmission (TX) randomizer 210, a Supplementary Reference Signal (SRS) stuffer 220, an RS (Reed-Solomon) encoder 230, a TX interleaver 240, a trellis/parity corrector 250, a TX multiplexer 260, and a modulator 270.

In FIG. 7, the TX randomizer 210 randomizes the multi-TS and provides the randomized multi-TS to the SRS stuffer 220. The SRS stuffer 220 stuffs the SRS in a stuffing area of the multi-TS that is randomized in the TX randomizer 210. The RS encoder 230 RS-encodes the multi-TS having the stuffed SRS and provides the RS-encoded multi-TS to the TX interleaver 240.

The TX interleaver 240 interleaves the multi-TS that is RS-encoded in the RS encoder 230 byte by byte and provides the interleaved multi-TS to the trellis/parity corrector 250. The trellis/parity corrector 250 trellis-encodes the multi-TS that is interleaved in the TX interleaver 240. The trellis/parity corrector 250 includes twelve Trellis-Coded Modulations (TCMs), that is, TCM #1 through TCM #12 in this example embodiment, though not required. TCM #1 through TCM #12 include a Deterministic Trellis Reset (DTR). The DTR is responsible to reset a memory at an intended time to produce an output value which is always known when one of values stored to TCM #1 through TCM #12 is output.

The TX multiplexer 260 adds a field sync and a segment sync to the multi-TS output from the trellis/parity corrector 250, and multiplexes and outputs the multi-TS. The modulator 270 modulates the multi-TS output from the TX multiplexer 260 and outputs the modulated multi-TS.

Figure 8:
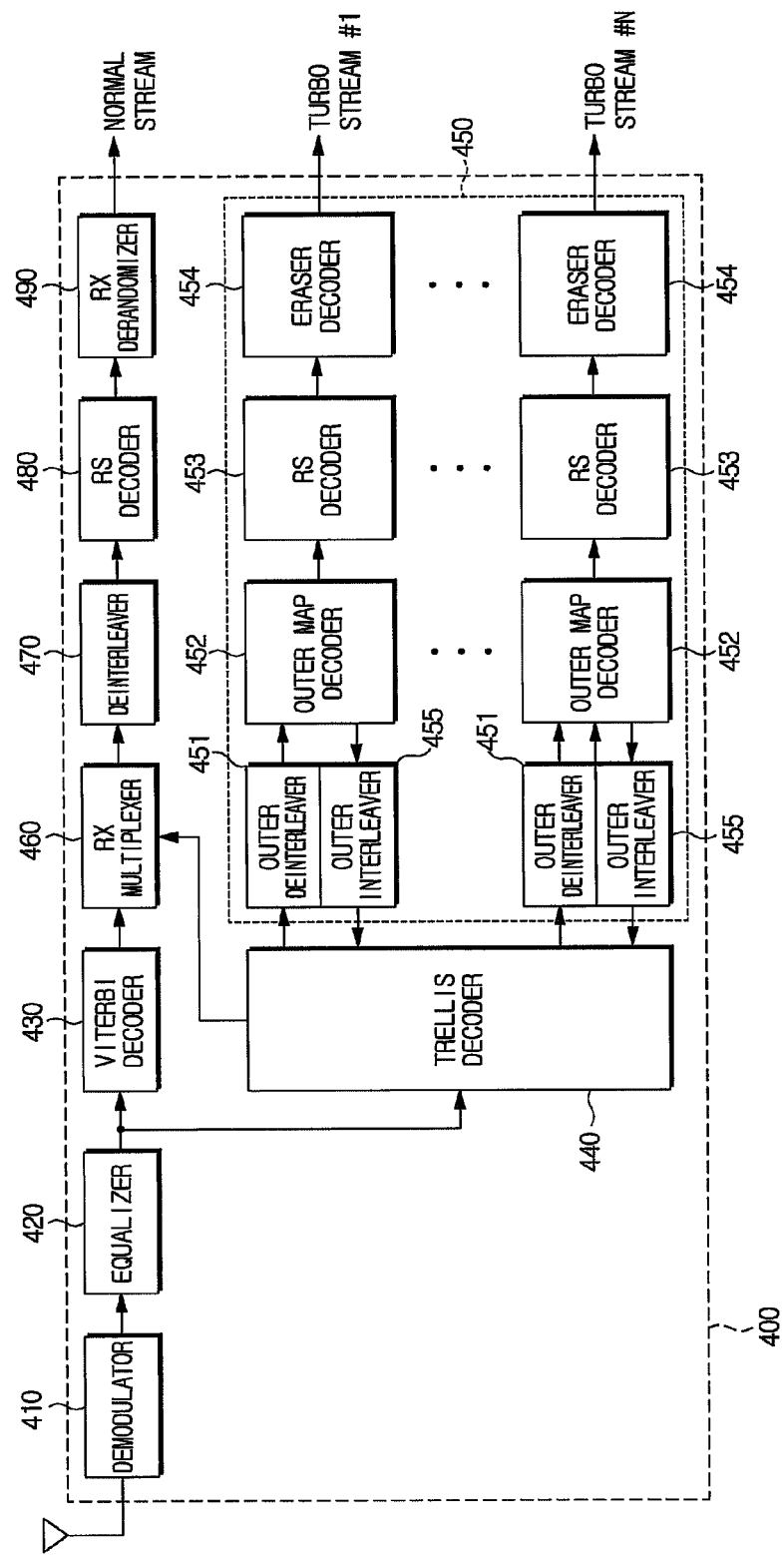
FIG. 8 is a block diagram of a digital broadcasting reception apparatus according to an example embodiment of the present invention.

The digital broadcasting transmission apparatus 200 receives the multi-TS from the multi-TS generating apparatus 100a of FIG. 2 or the multi-TS generating apparatus 100b of FIG. 5, processes the multi-TS through the TX randomizer 210, the SRS stuffer 220, the RS encoder 230, the TX interleaver 240, the trellis/parity corrector 250, the TX multiplexer 260, and the modulator 270, and then transmits the processed multi-TS to a digital broadcasting reception apparatus of FIG. 8, which will be described below, through a power amplifier 300.

As shown in FIG. 7, the digital broadcasting transmission apparatus 200 does not include a turbo processor in the transmitter to process a general multi-TS. Instead, the turbo processor for processing the general multi-TS is equipped in the multi-TS generating apparatus 100a of FIG. 2 or the multi-TS generating apparatus 100b of FIG. 5. Hence, it can be far easier to manage the transmitters at a studio stage. For instance, to upgrade the system, a related art transmitter has to update the entire transmitter, whereas in the digital broadcasting transmission apparatus that does not include a turbo processor in the transmitter, only the studio stage is upgraded since a turbo processor such as, the turbo processor 150a, or the turbo processor 150b is provided in the multi-TS generating apparatus, such as the multi-TS generating apparatus 100a, the multi-TS generating apparatus 100b, or the multi-TS generating apparatus 100c. The studio stage refers to a broadcast station that emits contents for broadcasting. The data is emitted in MPEG TS format.

FIG. 8 is a block diagram of a digital broadcasting reception apparatus 400 according to an example embodiment of the present invention. The digital broadcasting reception apparatus 400 includes a demodulator 410, an equalizer 420, a viterbi decoder 430, a trellis decoder 440, a turbo decoder 450, a reception (RX) multiplexer 460, a deinterleaver 470, an RF decoder 480, and an RX derandomizer 490. The digital broadcasting reception apparatus 400 receives the multi-TS from the digital broadcasting transmission apparatus 200 of FIG. 7.

As shown in FIG. 8, the demodulator 410 detects synchronization of the multi-TS according to sync signals appended to a baseband signal of the multi-TS received from the digital broadcasting reception apparatus 200 and demodulates the multi-TS. The equalizer 420 compensates for a channel distortion owing to a multipath of a channel by equalizing the multi-TS demodulated at the demodulator 410. The multi-TS equalized by the equalizer 420 is fed to the viterbi decoder 430 and the trellis decoder 440.

The viterbi decoder 430 corrects error of a normal stream of the multi-TS equalized by the equalizer 420 and decodes error-corrected symbols. The trellis decoder 440 trellis-decodes turbo streams, for example, of the multi-TS equalized by the equalizer 420. At this time, the plurality of the turbo streams is trellis-decoded by the trellis decoder 440, and the trellis decoder 440 provides respective turbo streams to the turbo decoder 450.

The turbo decoder 450 turbo-decodes the respective turbo streams that are trellis-decoded by the trellis decoder 440. The turbo decoder 450 includes an outer deinterleaver 451, an outer map decoder 452, an RS decoder 453, an eraser decoder 454, and an outer interleaver 455. The outer deinterleaver 451 deinterleaves a respective one trellis-decoded turbo stream. The outer map decoder 452 decodes the one turbo stream deinterleaved by the outer deinterleaver 451. The RS decoder 453 RS-decodes the one turbo stream decoded by the outer map decoder 452. The eraser decoder 454 eraser-decodes the one turbo stream RS-decoded by the RS decoder 453.

When a soft decision is output from the outer map decoder 452, the outer interleaver 455 interleaves the one turbo stream decoded at the outer map decoder 452 and provides the one interleaved turbo stream to the trellis decoder 440. The RX multiplexer 460 receives the viterbi-decoded normal stream from the viterbi decoder 430 and the normal stream from the trellis decoder 440, multiplexes and outputs the two normal streams. A normal stream from the viterbi decoder 430 is different from a normal stream from the trellis decoder 440. The output of the equalizer 420 is a normal stream which includes the turbo stream in the adaptation field. The normal stream including the turbo stream is input to the viterbi decoder 430 and the trellis decoder 440. The viterbi decoder 430 receives the normal stream including the turbo stream, and decodes the received normal stream using a viterbi algorithm. The trellis decoder 440 outputs only the turbo stream included in the normal stream. Accordingly, the viterbi decoder 430 decodes a normal stream, and the trellis decoder 440 decodes a turbo stream.

The deinterleaver 470 deinterleaves the normal stream (or the multiplexed normal streams) fed from the RX multiplexer 460 and provides the deinterleaved normal stream to the RS decoder 480. The RS decoder 480 RS-decodes the normal stream deinterleaved by the deinterleaver 470 and provides the RS-decoded normal stream to the RX derandomizer 490. The RX derandomizer 490 derandomizes the normal stream RS-decoded by the RS decoder 480 and outputs the derandomized normal stream.

Figure 9:
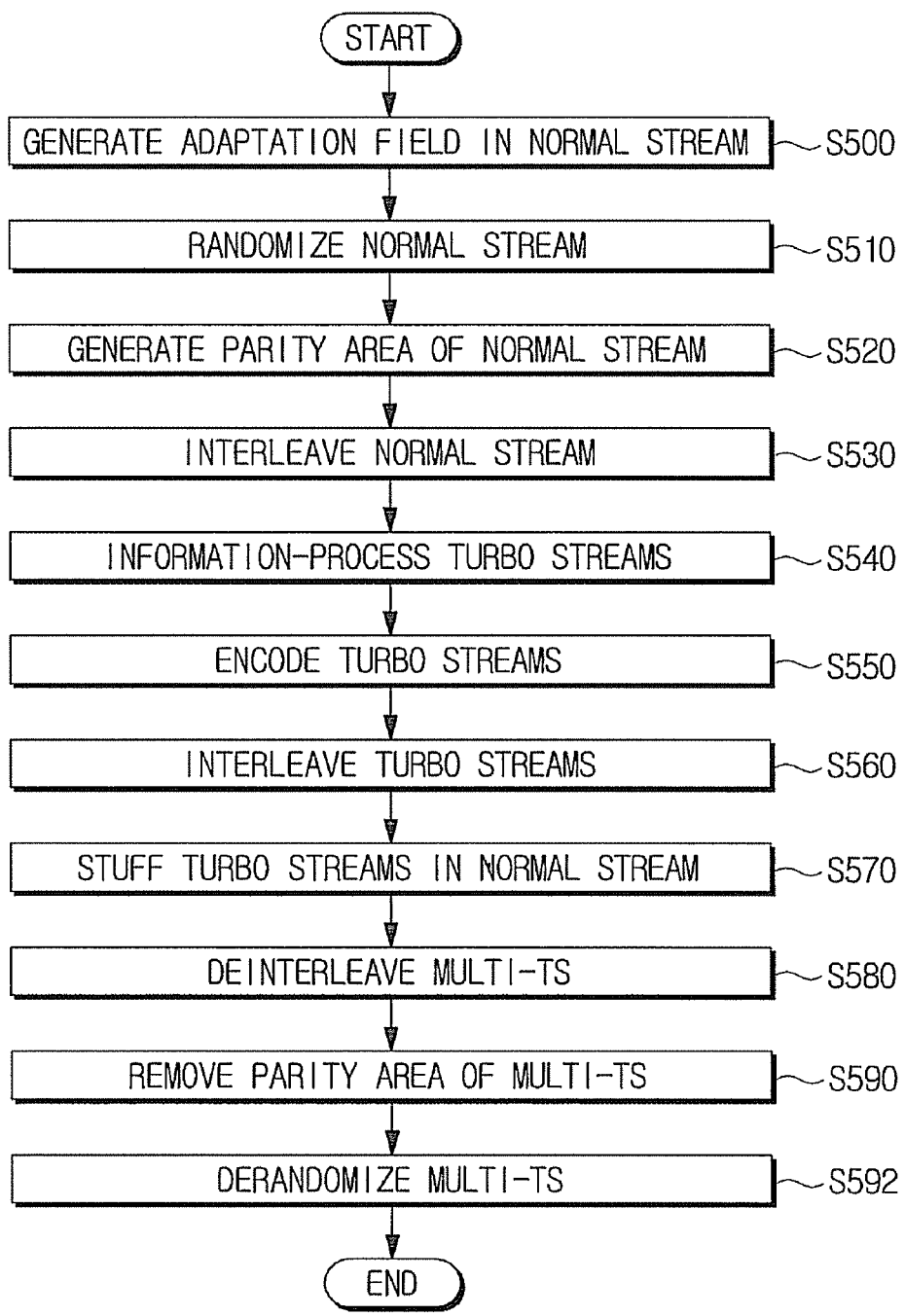
FIG. 9 is a flowchart outlining a multi-TS generating method according to another example embodiment of the present invention.

FIG. 9 is a flowchart outlining a multi-TS generating method according to an example embodiment of the present invention. The shown multi-TS generating method is explained by referring to FIGS. 2 and 9.

As shown in FIG. 9, the adaptor 110 receives the normal stream, generates the adaptation field in some packets of the received normal stream, and provides the normal stream to the randomizer 120 (operation S500). The randomizer 120 randomizes the normal stream including the generate adaptation field (operation S510). The parity area generator 130 generates the parity area for the randomized normal stream (operation S520). The interleaver 140, then interleaves the normal stream including the generated parity area (operation S530).

The turbo streams are processed by the turbo processor 150a. Specifically, the plurality of the turbo streams is information-processed in the turbo preprocessors 152 (operation S540), encoded in the outer encoders 154 (operation S550), interleaved in the outer interleavers 156 (operation S560), and then output.

The stuffer 160 generates the multi-TS by stuffing the turbo streams fed from the turbo processor 150a into the adaptation field of the normal stream fed from the interleaver 140 (operation S570). The multi-TS generated in the stuffer 160 is deinterleaved by the deinterleaver 170 (operation S580). The parity area is removed from the multi-TS by the parity area eliminator 180 (operation S590). Next, the multi-TS is derandomized in the derandomizer 190 (operation S592) and transmitted to the digital broadcasting transmission apparatus 200.

Figure 10:
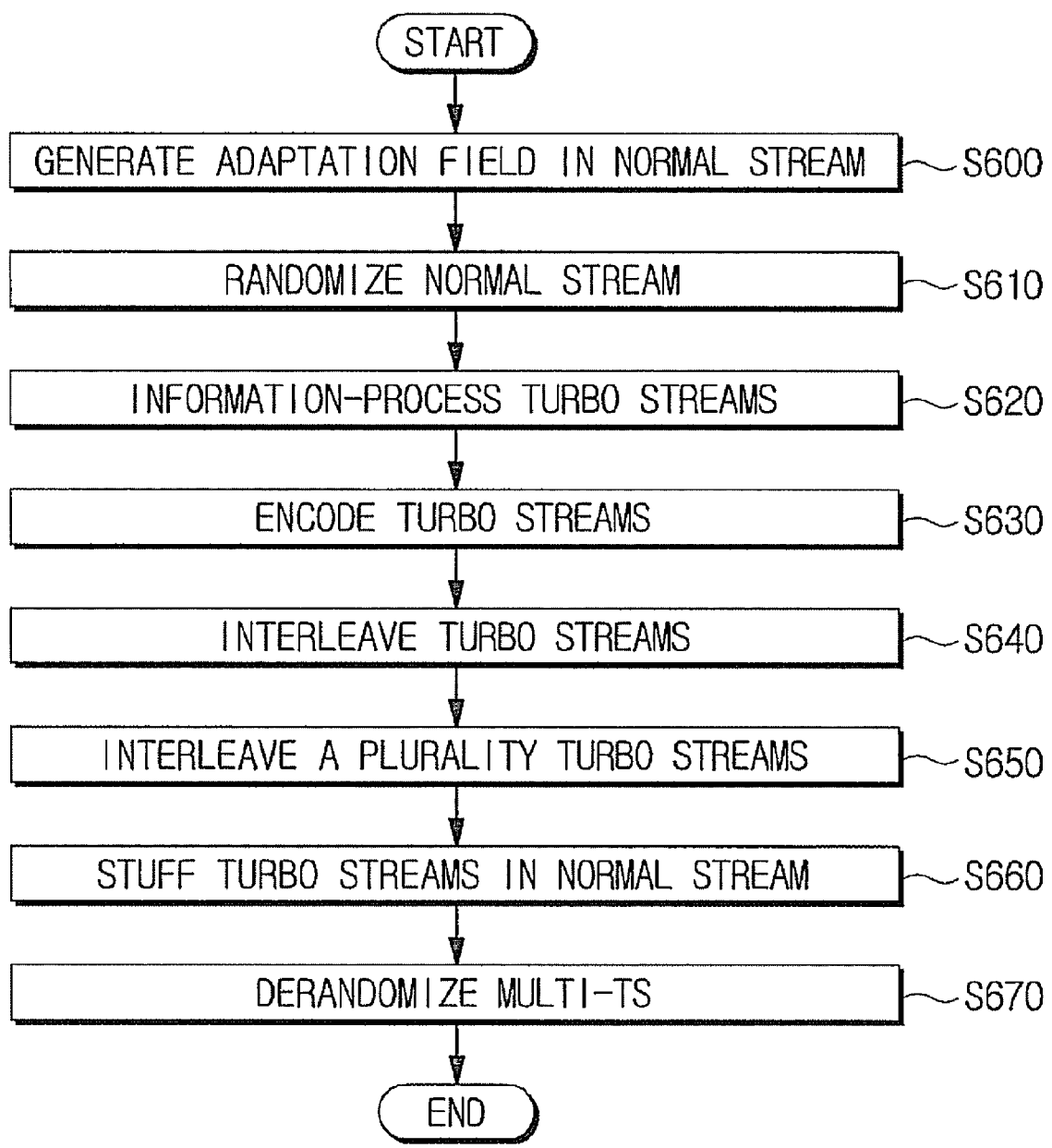
FIG. 10 is a flowchart outlining a multi-TS generating method according to another example embodiment of the present invention.

FIG. 10 is a flowchart outlining a multi-TS generating method according to another example embodiment of the present invention. The shown the multi-TS generating method is described by referring to FIGS. 5 and 10.

As shown in FIG. 10, the adaptor 110 receives the normal stream and generates the adaptation field in some packets of the received normal stream (operation S600). The normal stream including the adaptation field is randomized by the randomizer 120 (operation S610).

The turbo processor 150a, for example, receives and processes the turbo streams. Specifically, respective ones of the plurality of the turbo streams is respectively preprocessed by the turbo preprocessors 152 (operation S620), encoded by the outer encoders 154 (operation S630), and interleaved by the outer interleavers 156 (operation S640).

When the turbo coding of the turbo streams is completed at the turbo processor 150a, the multi-stream interleaver 195 interleaves the turbo-coded turbo streams together and provides the interleaved turbo streams to the stuffer 160 (operation S650). The stuffer 160 generates the multi-TS by stuffing the turbo streams (or packets thereof) fed from the multi-stream interleaver 195 into the normal stream fed from the randomizer 120 (operation S660). The multi-TS generated by the stuffer 160 is derandomized by the derandomizer 190 (operation S670) and then transmitted to the digital broadcasting transmission apparatus 200.

Figure 11:
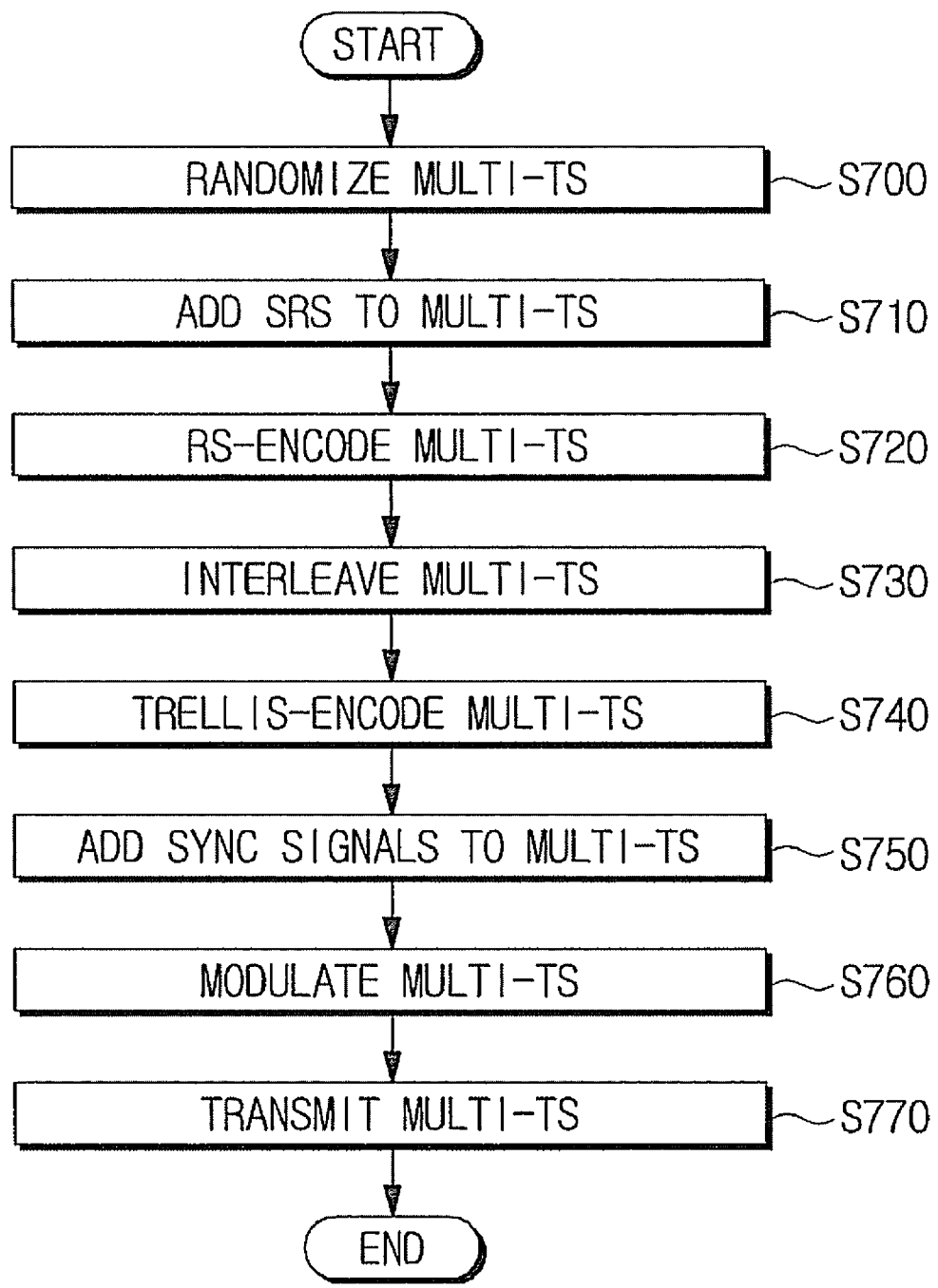
FIG. 11 is a flowchart outlining a digital broadcasting transmission method according to an example embodiment of the present invention.

FIG. 11 is a flowchart outlining a digital broadcasting transmission method according to an example embodiment of the present invention. The digital broadcasting transmission method is explained by referring to FIGS. 7 and 11.

Upon receiving the multi-TS from the multi-TS generating apparatus 100a of FIG. 2 or the multi-TS generating apparatus 100b of FIG. 5, the TX randomizer 210 receives and randomizes the multi-TS (operation S700). The SRS (Supplementary Reference Signal) stuffer 220 appends SRS (supplementary reference signal) to the stuffing area of the multi-TS randomized by the TX randomizer 210 (operation S710).

The RS encoder 230 RS-encodes the SRS-appended multi-TS (operation S720), and the TX interleaver 240 interleaves the RS-encoded multi-TS (operation S730). The trellis/parity corrector 250 trellis-encodes the interleaved multi-TS (operation S740). The TX multiplexer 260 multiplexes by adding a field sync and a segment sync to the trellis-encoded multi-TS (operation S750). The modulator 270 modulates the multi-TS multiplexed by the TX multiplexer 260 (operation S760). The modulated multi-TS is transmitted to the digital broadcasting reception apparatus 400 through the power amplifier 300.

Figure 12:
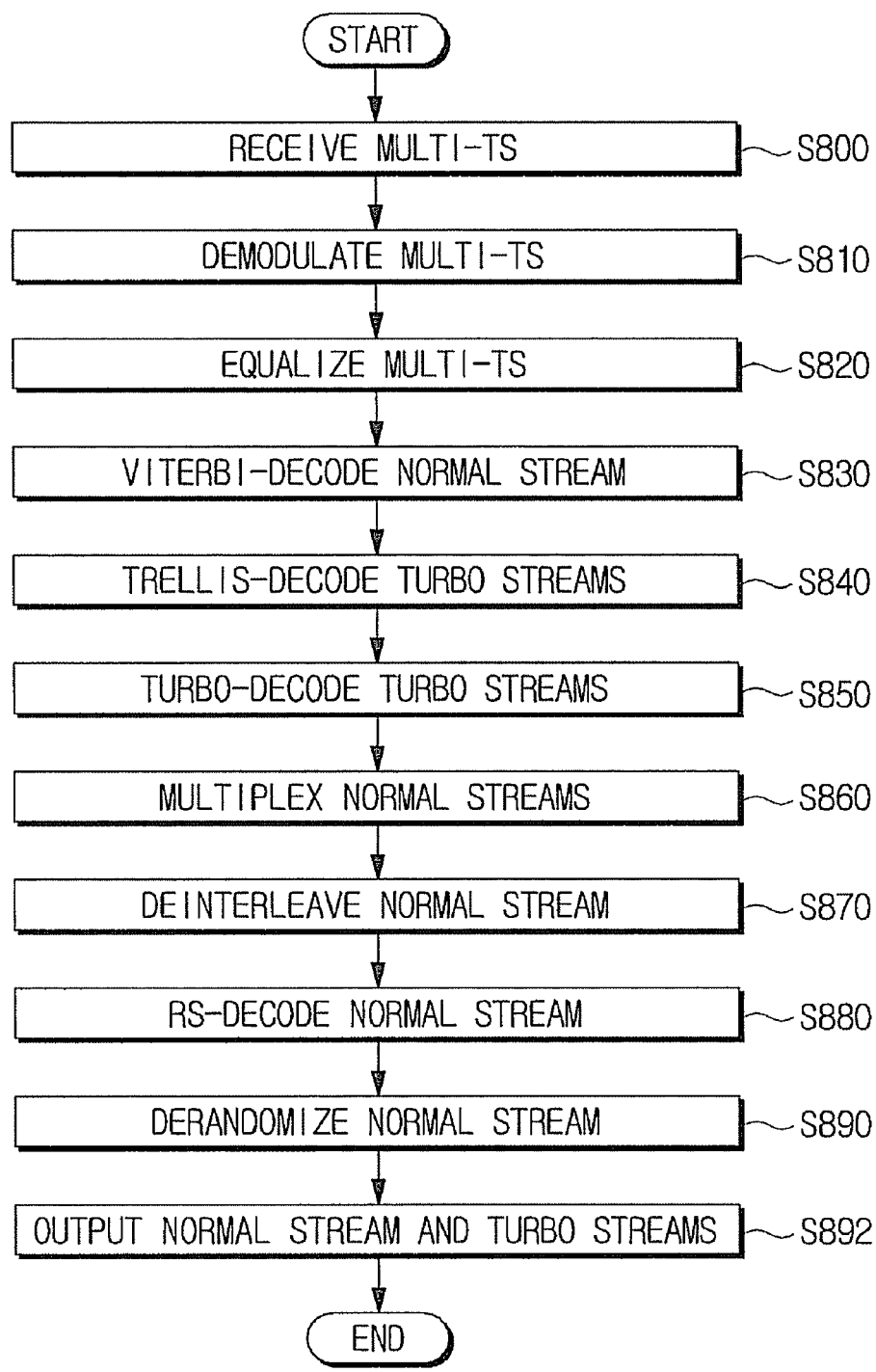
FIG. 12 is a flowchart outlining a digital broadcasting reception method according to an example embodiment of the present invention.

FIG. 12 is a flowchart outlining a digital broadcasting reception method according to an example embodiment of the present invention. The digital broadcasting reception method is explained by referring to FIGS. 8 and 12.

The demodulator 410 receives the multi-TS from the digital broadcasting transmission apparatus 200 (operation S800) and demodulates the received multi-TS (operation S810). The equalizer 420 equalizes the demodulated multi-TS (operation S820). The equalizer 420 provides the equalized multi-TS to the viterbi decoder 430 and the trellis decoder 440 respectively. The viterbi decoder 430 viterbi-decodes the normal stream of the equalized multi-TS (operation S830). The trellis decoder 440 trellis-decodes the turbo streams of the equalized multi-TS (operation S840). The trellis-decoded turbo streams are turbo-decoded by the turbo decoder 450 and then output (operation S850).

The RX multiplexer 460 receives the normal stream from the trellis decoder 440 and multiplexes it with the normal stream fed from the viterbi decoder 430 (operation S860). The deinterleaver 470 deinterleaves the normal stream (or normal streams) multiplexed by the RX multiplexer 460 (operation S870). The RS decoder 480 RS-decodes the deinterleaved normal stream (operation S880). The RX derandomizer 490 derandomizes the RS-decoded normal stream (operation S890). Next, the normal stream is output from the RX derandomizer 490 and the turbo streams are output from the eraser decoders 454 (operation S892).

Note that operations S830 through S850 and S860 through S890 are arranged in the above described order to ease understanding of this example embodiment of the present invention. The order of those operations can be carried out at the same time or otherwise altered.

As set forth above, a multi-TS generating apparatus and method and the digital broadcasting transmission and reception apparatuses and methods can achieve an improved packet structure when a receiver demodulates a stream and greatly facilitate the management of a transmission system because the multi-TS generating apparatus at the studio stage turbo-codes the turbo streams. Since the multi-TS generating apparatus processes most of the turbo streams, the hardware structure of the digital broadcasting transmission and reception apparatuses can be simplified and the plurality of the turbo streams can be easily transceived.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the turbo processor 150a or the turbo processor 150b may be used with the multi-TS generating apparatus 100a or the multi-transport stream (TS) generating apparatus 100a. In various example embodiments, the normal stream and the turbo stream may include respective packets. Accordingly, it is intended, therefore, that the present invention not be limited to the various example embodiments disclosed, but that the present invention includes all embodiments falling within the scope of the appended claims.

What is claimed is:

1. A digital broadcasting reception apparatus, comprising:
   a demodulator to demodulate input data comprising normal data and additional data;
   an equalizer to equalize the demodulated data; and
   a decoder to decode the equalized data,
   wherein the decoder comprises:
      a trellis decoder to receive and trellis decode the equalized data;
      a deinterleaver to deinterleave the trellis-decoded additional data without deinterleaving the normal data; and
      an outer decoder to convolutional decode the deinterleaved additional data.

2. The digital broadcasting reception apparatus of claim 1, further comprising:
   a Viterbi decoder to Viterbi decode the normal data included in the equalized data.

3. The digital broadcasting reception apparatus of claim 1, wherein the decoder comprises:
   a trellis decoder to trellis decode the additional data included in the equalized data; and
   a turbo decoder to turbo decode the trellis-decoded additional data.

4. The digital broadcasting reception apparatus of claim 1, wherein the decoder further comprises
   a Reed Solomon (RS) decoder to RS-decode the convolutional decoded additional data.

5. A data processing method, comprising:
   demodulating input data comprising normal data and additional data;
   equalizing the demodulated data; and
   decoding the additional data included in the equalized data,
   wherein the decoding comprises:
      receiving and trellis decoding the equalized data;
      deinterleaving the trellis-decoded additional data without deinterleaving the normal data; and
      convolutional decoding the deinterleaved additional data.

6. The data processing method of claim 5, further comprising:
   Viterbi decoding the normal data included in the equalized data.

7. The data processing method of claim 5, wherein the decoding comprises:
   trellis decoding the additional data included in the equalized data; and
   turbo decoding the trellis-decoded additional data.

8. The data processing method of claim 5, wherein the decoding further comprises Reed Solomon (RS) decoding the convolutional decoded additional data.

9. The digital broadcasting reception apparatus of claim 4, wherein the decoder further comprises an interleaver to interleave the convolutional-decoded additional data and provide the interleaved additional data to the trellis decoder.

10. The data processing method of claim 8, wherein the decoding further comprises interleaving the convolutional-decoded additional data and providing the interleaved additional data for trellis decoding.

11. The digital broadcast reception apparatus of claim 1, wherein the input data comprises known data being previously known between the digital broadcasting reception apparatus and a digital broadcast transmission apparatus, and
    wherein the input data has been interleaved before the input data is received at the digital broadcast reception apparatus.

12. The data processing method of claim 5, wherein the input data comprises known data being previously known between the digital broadcasting reception apparatus and a digital broadcast transmission apparatus, and
    wherein the input data has been interleaved before the input data is received at the digital broadcast reception apparatus.

* * * * *